March 17, 1925.                                        1,530,113
J. G. GIBSON
VALVE
Filed Aug. 4, 1924

Inventor
Jesse G. Gibson
By _____
Attorney

Patented Mar. 17, 1925.

1,530,113

UNITED STATES PATENT OFFICE.

JESSE G. GIBSON, OF GROVE CITY, PENNSYLVANIA, ASSIGNOR TO THE BESSEMER GAS ENGINE COMPANY, OF GROVE CITY, PENNSYLVANIA, A CORPORATION OF PENNSYLVANIA.

VALVE.

Application filed August 4, 1924. Serial No. 729,947.

*To all whom it may concern:*

Be it known that I, JESSE G. GIBSON, a citizen of the United States, residing at Grove City, in the county of Mercer and State of Pennsylvania, have invented new and useful Improvements in Valves, of which the following is a specification.

This invention is designed to improve valves of a type commonly termed feather valves. In an application filed by me August 24th, 1923, Serial Number 659,125 I have improved valves of this type and the present invention relates to an improvement in the method of connecting the feather valve plates to the pivot pin in the construction there disclosed and an improvement in locating the pivot pin so as to make the valve plates properly register with the valve seats.

The invention is illustrated in the accompanying drawings as follows:—

Figure 1:
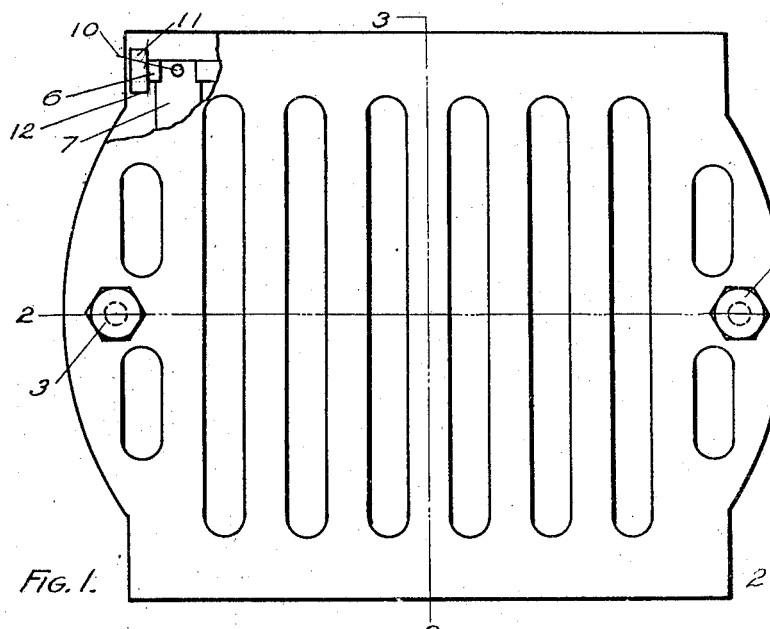

Fig. 1 shows a plan view of the assembled valve.

Figure 2:
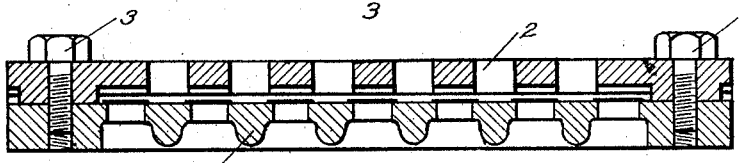

Fig. 2 a section on the line 2—2 in Fig. 1.

Figure 3:
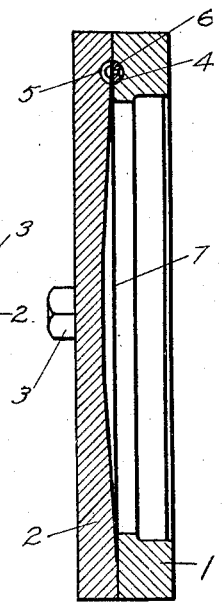

Fig. 3 a section on the line 3—3 in Fig. 1.

Figure 4:
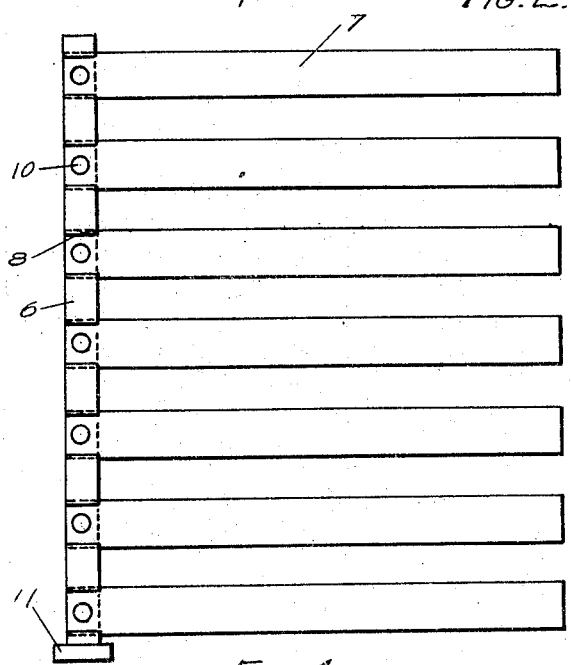

Fig. 4 a plan view of the assembled feather plates.

Figure 5:
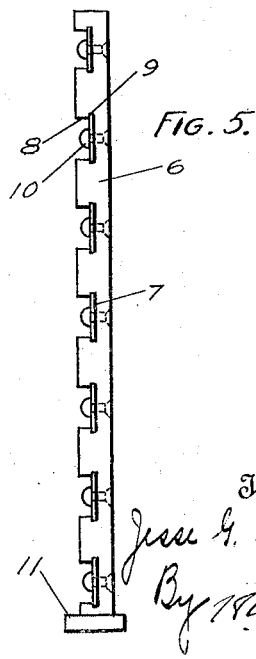

Fig. 5 an end view of the same.

1 marks the seat plate for the valve and 2 the guard plate. These are secured together in the usual manner by screws 3 and have off-set openings as is common in this type of valve. The seat plate has the groove 4 which registers with a groove 5 in the guard plate forming a bearing for the pivot pin 6 of the feather valve plates 7.

In the structure shown in my former application the feather plates were secured to the pin by extending the plates into a slot in the face of the pin. In the present construction I provide the pins with notches 8 in which the feather plates are placed and secured. Preferably the notches are undercut at 9 and the feather plates are secured in the notches by rivets 10, the notches forming a housing for the head of the rivet and exposing sufficient surface so that the rivet may be readily placed. This structure gives a more satisfactory connection between the plate and the pivot pin.

In order that the plates may be nicely and properly registered with their seats and maintained in this position I prefer to provide the pin 6 with a shoulder 11 which shoulder seats in companion grooves 12 in the guard plate and seat plate. This holds the pin and consequently the plates accurately in position and has a wearing surface to assure a continuation of this position.

What I claim as new is:—

1. In a valve, the combination of a seat; a resilient feather plate closing the seat; a pivot pin for the feather plate, said pivot pin being notched to receive the feather plate exposing one face of the feather plate; and means of securing the feather plate in the notch, said pin rocking with a flexure of the feather plate in opening and closing the valve.

2. In a valve, the combination of a seat; a resilient feather plate closing the seat; a pivot pin for the feather plate, said pivot pin being notched to receive the feather plate exposing one face of the feather plate; and means of securing the feather plate in the notch comprising a rivet extending through the plate and pin, said pin rocking with a flexure of the feather plate in opening and closing the valve.

3. In a valve, the combination of a seat; a resilient feather plate closing the seat; a pivot pin for the feather plate, said pivot pin having an undercut notch to receive the feather plate and exposing one face of the feather plate; and means of securing the feather plate in the notch, said pin rocking with a flexure of the feather plate in opening and closing the valve.

4. In a valve, the combination of a seat; a resilient feather plate closing the seat; a pivot pin for the feather plate, said pivot pin having an undercut notch to receive the feather plate and exposing one face of the feather plate; and means of securing the feather plate in the notch comprising a rivet extending through the plate and pin, said pin rocking with a flexure of the feather plate in opening and closing the valve.

5. In a valve, the combination of a seat; a resilient feather plate closing the seat; a pivot pin to which one end of the feather plate is attached, said pin rocking with a flexure of the feather plate and having a shoulder thereon; and means on the seat engaging the shoulder for locking the pin and feather plate in register with its seat.

6. In a valve, the combination of a seat plate; a guard plate; a feather plate between the seat plate and the guard plate; a pivot pin to which the feather plate is secured having a bearing in the guard and seat plates; a shoulder on the pin; and means in the guard and seat plates acting with the shoulder to lock the pin against axial movement.

In testimony whereof I have hereunto set my hand.

JESSE G. GIBSON.